(12) United States Patent
Abramson et al.

(10) Patent No.: US 6,625,204 B1
(45) Date of Patent: Sep. 23, 2003

(54) SYNCHRONIZATION AND BIT DETECTION IN A SINGLE SPREADING SEQUENCE SAMA RECEIVER

(75) Inventors: Norman Abramson, San Francisco, CA (US); Eric Copeland, Los Altos, CA (US)

(73) Assignee: Aloha Networks, Inc., San Francisco, CA (US)

( * ) Notice: Subject to any disclaimer, the term of this patent is extended or adjusted under 35 U.S.C. 154(b) by 0 days.

(21) Appl. No.: 09/296,589

(22) Filed: Apr. 23, 1999

Related U.S. Application Data (60) Provisional application No. 60/082,863, filed on Apr. 24, 1998.

(51) Int. Cl.[7] .................................................. H04B 1/69
(52) U.S. Cl. ........................................ 375/152; 375/342
(58) Field of Search ................................. 375/130, 142, 375/147, 150, 152

(56) References Cited

U.S. PATENT DOCUMENTS

| | | |
|---|---|---|
| 4,455,651 A | 6/1984 | Baran |
| 4,545,061 A | 10/1985 | Hileman |
| RE32,905 E | 4/1989 | Baran |
| 4,841,527 A | 6/1989 | Raychaudhuri et al. |
| 4,847,861 A | 7/1989 | Hamatsu et al. |
| 4,905,221 A | 2/1990 | Ichiyoshi |
| 5,012,469 A | 4/1991 | Sardana |
| 5,084,900 A | 1/1992 | Taylor |
| 5,136,612 A | 8/1992 | Bi |
| 5,151,919 A | 9/1992 | Dent |
| 5,218,619 A | 6/1993 | Dent |
| 5,228,054 A | 7/1993 | Rueth et al. |
| 5,229,226 A | 7/1993 | Bito et al. |
| 5,235,612 A | 8/1993 | Stilwell et al. |
| 5,245,612 A | 9/1993 | Kachi et al. |
| 5,253,268 A | 10/1993 | Omura et al. |
| 5,257,257 A | 10/1993 | Chen et al. |
| 5,257,283 A | 10/1993 | Gilhousen et al. |
| 5,272,721 A | 12/1993 | Mikoshiba et al. |
| 5,305,348 A | 4/1994 | Izumi |
| 5,377,225 A | 12/1994 | Davis |
| 5,410,568 A | 4/1995 | Schilling |
| 5,430,760 A | 7/1995 | Dent |
| 5,430,761 A | 7/1995 | Bruckert et al. |
| 5,537,397 A | 7/1996 | Abramson |
| 5,745,485 A | 4/1998 | Abramson |
| 5,963,586 A | * 10/1999 | Durrant et al. ............. 375/142 |
| 6,151,313 A | * 11/2000 | Abramson .................. 370/342 |

OTHER PUBLICATIONS

D. Meile, "Most Often Asked Questions About CDMA," Qualcomm Announcement (Aug. 23, 1991).
R. Price et al., "A Communication Technique for Multipath Channels," Proceedings of the IRE, vol. 46, Mar. 1958, pp. 555–570.
D.W. Lipke et al., "MARISAT—A Maritime Satellite Communication System," COMSAT Technical Review, vol. 7, No. 2, Fall 1977, pp. 351–391.
M. Marcus, "Regulatory Policy Considerations for Radio Local Area Networks," IEEE Communications Magazine, vol. 25, No. 7, Jul. 1987, pp. 95–99.

(List continued on next page.)

*Primary Examiner*—Tesfaldet Bocure
*Assistant Examiner*—Kevin M. Burd
(74) *Attorney, Agent, or Firm*—Thelen Reid & Priest LLP; Robert E. Krebs (57) ABSTRACT

In simultaneous reception of overlapping signals sharing a single spreading sequence, packet start times are found by separately demodulating, low pass filtering and despreading in-phase and quadrature components. Despread in-phase and quadrature signals are provided to sychronization filters connected in parallel and arranged in two identical pairs. Outputs from filters in different pairs are added, and the sums are squared. The squared signals are added. An exceeded threshold of the output from the last adder delineates a packet start. Knowing packet start times facilitates separating the overlapping inbound signals.

14 Claims, 4 Drawing Sheets

OTHER PUBLICATIONS

N. Abramson, "Development of the ALOHANET" IEEE Transactions on Information Theory, vol. IT–31, No. 2, Mar. 1985, pp. 119–123.

N. Abramson, "Multiple Access in Wireless Digital Networks," Invited paper, Proceedings of the IEEE, Sep. 1994.

N. Abramson, "Spread Aloha for VSAT Networks," ALOHA Systems Technical Report B86–4b, Jun. 1986, Revised Jan. 1987.

"CDMA Wireless Communications," Commercial Brochure, Apr. 30, 1993.

R.A. Scholtz, "Multiple Access with Time–Hopping Impulse Modulation," Communication Sciences Institute, paper, University of Southern California, Los Angeles, California.

R. Steele, "Speech Codecs for Personal Communications," IEEE Communications Magazine, Nov. 1993, pp. 76–83.

M Ewerbring, "CDMA–IC: a Proposal for Future High Capacity Digital Cellular Systems," Proceedings of the 1993 Vehic. Tech. Conf., pp. 440–443.

R. Kerr, "CDMA Digital Cellular," Applied Microwave and Wireless, pp. 30–41.

N. Abramson, "Fundamentals of Packet Multiple Access for Satellite Networks," IEEE Journal on Selected Areas in Communications, vol. 10, No. 2, Feb. 1992, pp. 309–316.

N. Abramson, "VSAT Data Networks," invited paper, Proceedings of the IEEE vol. 78, No. 7, Jul. 1990, pp. 1267–1274.

Audrey M. Viterbi and Andrew J. Viterbi, "Erlang Capacity of a Power Controlled CDMA System," QUALCOMM Incorporated, Feb. 11, 1993.

N. Abramson, "A Note on Code Division in CDMA," Data Base Associates, DBA/Wireless Systems, May 1994.

* cited by examiner

SYNCHRONIZATION AND BIT DETECTION IN A SINGLE SPREADING SEQUENCE SAMA RECEIVER

This application claims the benefit of U.S. Provisional Application No. 60/082,863, filed Apr. 24, 1998.

BACKGROUND OF THE INVENTION

SUMMARY OF THE INVENTION

In a Spread ALOHA receiver, when the received signal is a linear combination of the transmitted signals the detection of multiple overlapping packets is simplified. In the present invention, equations are derived that describe a QAM modulation and demodulation process in order to specify a common notation to be used in the network design. In the case of a single transmitter the derived equations are well known. For the case of a Spread ALOHA multiple access channel however, interest lies in the simultaneous reception of many overlapping signals. The problem does not appear to have been treated in the literature.

A receiver for spread bit packet signal transmissions has an input line with a QAM modulator connected thereto. The QAM modulator has a splitter connected to the input line for separating the input into first and second paired inputs. First and second multipliers are connected to the first and second pair inputs. A numerically controlled oscillator is connected to the first multiplier. A 90° phase shifter is connected to the numerically controlled oscillator and is connected to the second multiplier. First and second output lines are connected to the first and second multipliers. First and second low pass filters are connected to the first and second output lines for removing high frequencies from the outputs. First and second demodulated signal lines are connected to outputs of the first and second low pass filters, and first and second despreading filters are connected to the first and second demodulated signal lines. First and second despread signal lines are connected to outputs of the first and second despreading filters. First and second pairs of synchronization matched filters are connected to the first and second despread signal lines for producing packet synchronization sequence outputs.

A preferred method of information detection in a single spreading sequence receiver comprises receiving packet and chip signals in QAM modulated carrier wave signals with in-line and quadrature components. The received signals are supplied to first and second multipliers. Output is supplied from a numerically controlled oscillator to the first multiplier and to a 90° phase shifter. An output is supplied from the 90° phase shifter to the second multiplier. Output signals are supplied from the first and second multipliers to first and second low pass filters, and high frequency signals are removed in the low pass filters. First and second outputs are provided from the first and second low pass filters to first and second despreaders. First and second despread signals are provided from output of the first and second despreaders to inputs of first and second pairs of synchronization filters.

In one preferred embodiment, inputs of first and second synchronization filters are connected in parallel and the first despread signal is supplied from the first despreader to the inputs of the first and second synchronization filters. Second and third synchronization filters are connected in parallel to an output of the second despreader. Despread signals are supplied from the output of the second despreader to inputs of the third and fourth synchronization filters. Outputs of the first and third synchronization filters are supplied to a first adder. Outputs of the second and fourth sychronization filters are supplied to a second adder. An output of the first adder and an output of the second adder are squared, and squared outputs from the first and second squarers are added in a third adder. A threshold of an output from the third adder is detected as a start of a packet.

These and further and other objects and features of the invention are apparent in the disclosure, which includes the above and ongoing written specification, with the claims and the drawings.

DETAILED DESCRIPTION OF THE PREFERRED EMBODIMENTS

Transmitter for One Signal

Figure 1:
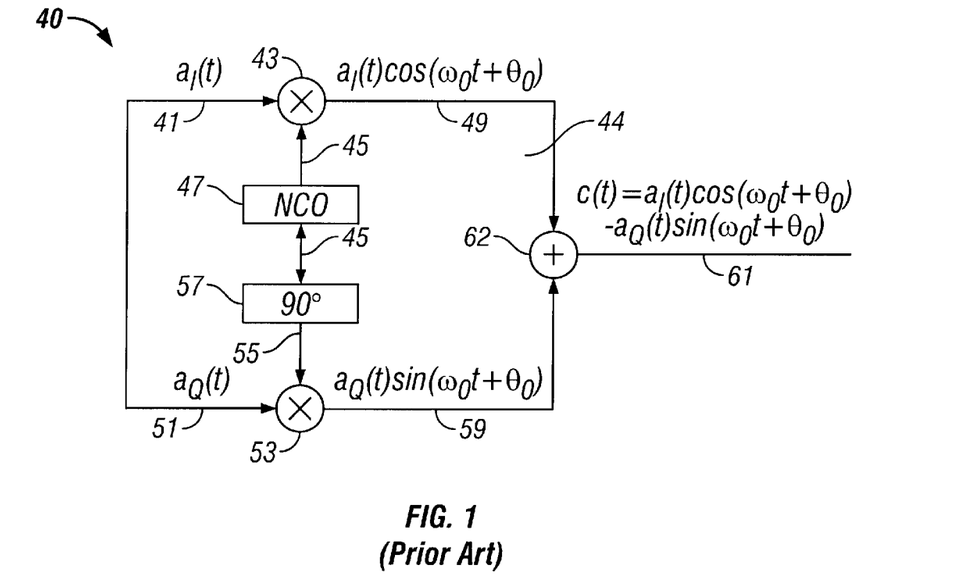
FIG. 1 is a schematic representation of a QAM modulator.

Assume we have two bandlimited signals, $a_I(t)$ and $a_Q(t)$ in transmitter 40. The QAM modulation 44 of these signals 41, 51 is accomplished by multiplying 43, 53 the signals 41, 41 by the output 45 of a numerically controlled oscillator (NCO) 47 while the quadrature multiplication 53 is shifted 90 degrees in phase. A block diagram of a QAM modulator 44 is shown in FIG. 1.

The output 55 of the phase shifter 57 is used in multiplier 53. The outputs 49 and 59 of the multipliers 43 and 53 are added 62 to produce an output signal 61.

In the usual situation, the in-phase 41 and quadrature 51 signals, $a_I(t)$ and $a_Q(t)$, are bandlimited to a frequency much less than the carrier frequency $\omega_0$. The phase shift, $\theta_0$, of the NCO 47 is assumed to be a random variable and not a function of time.

Receiver for One Signal

Figure 2:
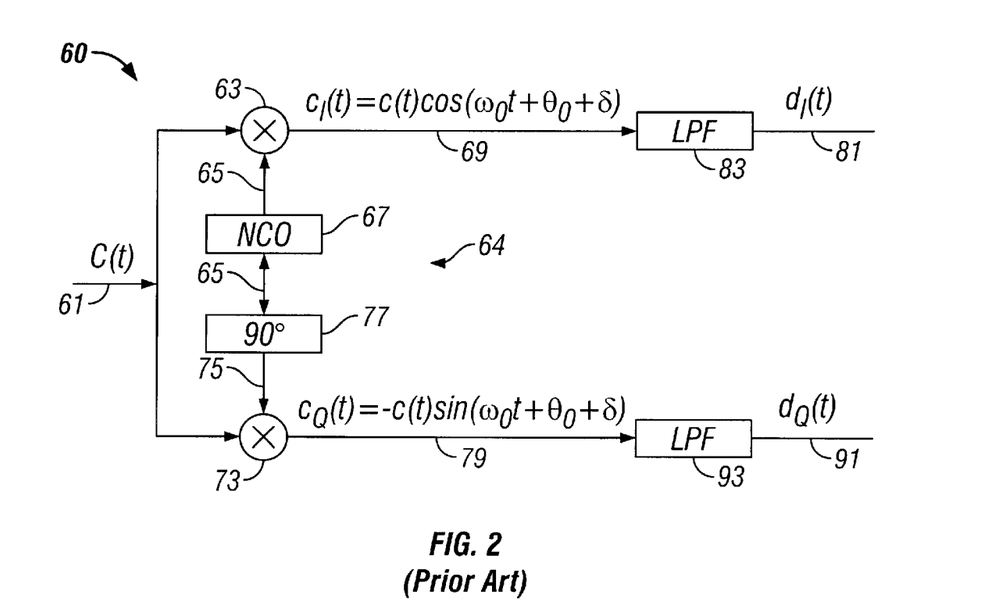
FIG. 2 is a schematic representation of a QAM demodulator.

The receiver 60 has a demodulator 64 for signal 61, as shown in FIG. 2. The overall structure of the demodulator 64 is similar to that of the modulator 44. The multiplication 63, 73 of the input 61 by the output 65 of an NCO 67 and the output 75 of phase shifter 77 results in a double frequency component and a baseband component in each channel 69, 79. The double frequency component is filtered out by low pass filters (LPF) 83, 93 and the outputs 81, 91 are just the original baseband signal, if $\delta$, the phase offset in the NCO 67 of the demodulator 64 is small.

To simplify the notation we define $$\omega t + \theta = \Theta \qquad (1)$$

Then the result of the top multiplication in FIG. 2 is $$c_1(t) = a_1(t)\cos(\Theta)\cos(\Theta + \delta) - a_Q(t)\sin(\Theta)\cos(\Theta + \delta) \qquad (2)$$
$$= 1/2 a_1(t)\cos(2\Theta + \delta) + 1/2 a_1(t)\cos(\delta) -$$
$$1/2 a_Q(t)\sin(2\Theta + \delta) + 1/2 a_Q(t)\sin(\delta)$$

and after elimination of the double frequency terms we have $$d_1(t) = \tfrac{1}{2} a_1(t)\cos(\delta) + \tfrac{1}{2} a_Q(t)\sin(\delta) \qquad (3)$$

so that for δ=0 we have $d_I(t)=½ a_I(t)$.
Similarly, $$c_Q(t) = -a_1(t)\cos(\Theta)\sin(\Theta + \delta) + a_Q(t)\sin(\Theta)\sin(\Theta + \delta) \quad (4)$$
$$= -1/2a_1(t)\sin(2\Theta + \delta) - 1/2a_1(t)\sin(\delta) -$$
$$1/2a_Q(t)\cos(2\Theta + \delta) + 1/2a_Q(t)\cos(\delta)$$

and after elimination of the double frequency terms, $$d_Q(t) = -½a_I(t)\sin(\delta) + ½a_Q(t)\cos(\delta) \quad (5)$$

so that for δ=0, $d_Q(t)=½ a_Q(t)$.

Receiver for a Multiple Access Channel

In the case of a Spread ALOHA broadcast channel, the results of (3) and (5) show that a synchronous detector for the reception of a signal from a single transmitter can be used for reception. In the case of the multiple access channel, however, the received signal is not in the form of c(t) as defined in FIG. 1, but rather it consists of a sum of signals each having the form of c(t), but each with a different carrier phase and a different modulated signal. Define this received signal as C(t).

$$C(t) = \sum_{1}^{n} a_{kI}(t)\cos(\omega_0 t + \theta_k) - \sum_{1}^{n} a_{kQ}(t)\sin(\omega_0 t + \theta_k) \quad (6)$$

where the index k specifies a given transmitter and there are n active transmitters in the interval of interest.

Then (3) and (5), which provide the received signal after the high order frequency terms have been filtered out, may be rewritten for the case of the multiple access channel with independent transmitters as, $$D_I(t) = \frac{1}{2}\sum_{1}^{n} a_{kI}(t)\cos(\delta_k) + \frac{1}{2}\sum_{1}^{n} a_{kQ}(t)\sin(\delta_k) \quad (7)$$

and $$D_Q(t) = -\frac{1}{2}\sum_{1}^{n} a_{kI}(t)\sin(\delta_k) + \frac{1}{2}\sum_{1}^{n} a_{kQ}(t)\cos(\delta_k) \quad (8)$$

From (7) and (8), it is shown that in the case of a multiple access channel with asynchronous transmitters (that is, multiple RF phase values), the in-phase and quadrature components of the signal cannot be separated by a single receiver synchronization process.

Figure 3:
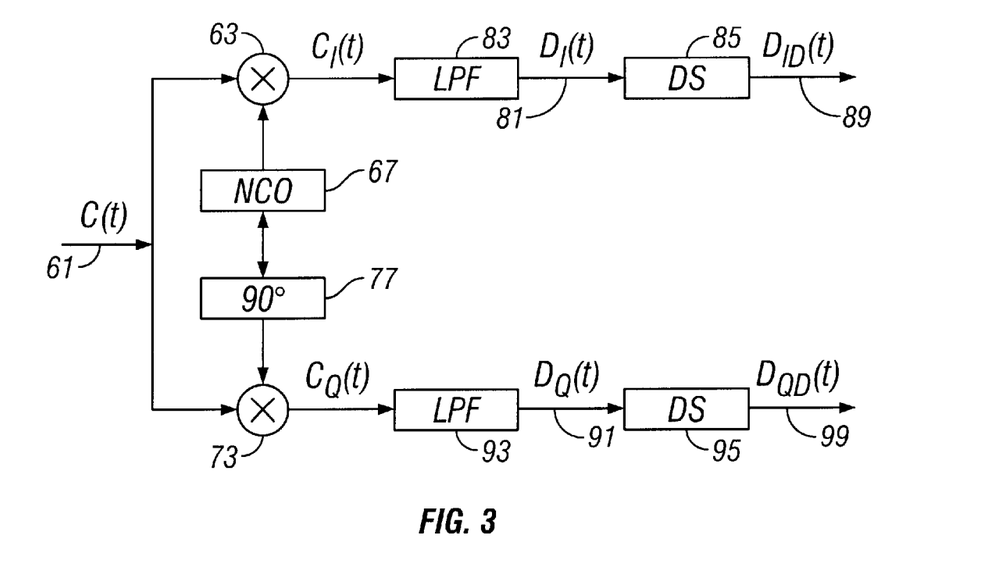
FIG. 3 is a schematic representation of a multiple access QAM demodulator.

Therefore, the following asynchronous multiple access generalization of the QAM transmitter 40 and receiver 60 described in FIGS. 2 and 3 were considered. We assume that the independent I and Q signals 41, 51 of FIG. 1, $a_I(t)$ and aQ(t), have been spread by the same spreading sequence, S.

The receiver 60 of FIG. 2 is expanded to show the despreading operation at the output of the LPF. In the case of an asynchronous multiple access channel, an identical despreading filter (DS) 85, 95 is provided at the output of each channel 81, 91 to produce signals 89 and 99.

In order to simplify the analysis, it is assumed that there are only two different active transmitters (k=2). After the problem is solved for the case of k=2, the case for general values of k is obvious. When k=2, equations (7) and (8) become, $$D_I(t)=½[a_{1I}(t)\cos(\delta_1)+a_{2I}(t)\cos(\delta_2)+a_{1Q}(t)\sin(\delta_1)+a_{2Q}(t)\sin(\delta_2)] \quad (9)$$

and $$D_Q(t)=½[-a_{1I}(t)\sin(\delta_1)-a_{2I}(t)\sin(\delta_2)+a_{1Q}(t)\cos(\delta_1)+a_{2Q}(t)\cos(\delta_2)] \quad (10)$$

Defining the outputs of the two despreading filters as shown in FIG. 3, and then ignoring the scale factor of ½, the equations become, $$D_{ID}(t)=b_{1I}(t)\cos(\delta_1)+b_{2I}(t)\cos(\delta_2)+b_{1Q}(t)\sin(\delta_1)+b_{2Q}(t)\sin(\delta_2)+N_I \quad (11)$$

$$D_{QD}(t)=-b_{1I}(t)\sin(\delta_1)-b_{2I}(t)\sin(\delta_2)+b_{1Q}(t)\cos(\delta_1)+b_{2Q}(t)\cos(\delta_2)+N_Q \quad (12)$$

Equations (11) and (12) provide sequences of samples with both the I samples and the Q samples in both $D_{ID}$ and $D_{QD}$. Separation of the desired b**(t) signals by means of an RF phase tracking loop as would be done in the case of a channel with only one received signal is not possible here. Therefore, a suboptimal procedure is provided for detecting the packet, composed of a packet detection procedure followed by a bit detection procedure.

Packet Detection/Bit Detection

The two channel outputs, $D_{ID}$ and $D_{QD}$ 89, 99 are shown in FIG. 3 and their expressions are provided in equations (11) and (12). This section describes a suboptimal procedure that allows recovery of the bits in the packets received by the asynchronous multiple access channel. Optimality is not claimed for this procedure, only that it will work, it is logical, and the processing required is not onerous.

The procedure begins with the process of packet detection, and uses the parameters derived from the packet detection process to make decisions on the bits in the packet. The reason for breaking the process apart in this manner is that the packet detection process operates with an output signal to noise ratio considerably higher than that of the bit detection process.

Equations (11) and (12) may be rewritten focusing on a single received signal and, in order to simplify the discussion, introduce a simplified notation.

$$D_{ID}(t)=b_{1I}(t)\cos(\delta_1)+b_{1Q}(t)\sin(\delta_1)+n_I(t) \quad (13)$$

$$D_{QD}(t)=-b_{1I}(t)\sin(\delta_1)+b_{1Q}(t)\cos(\delta_1)+n_Q(t) \quad (14)$$

In order to detect a packet each of the D**(t) signals are passed through two filters matched to the I and Q channel synchronization pulse sequences. The continuous version of these filters have impulse response functions $h_I(-t)$ and $h_Q(-t)$, respectively. The result of the synching filters is defined on each of the component input signals, as shown in FIG. 4.

Figure 4:
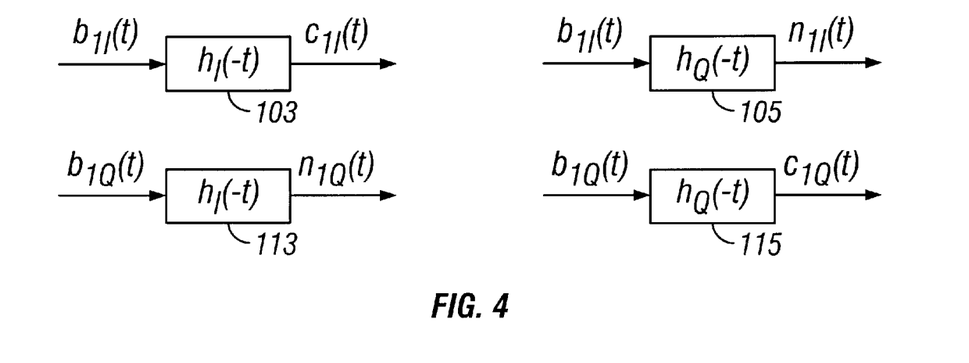
FIG. 4 is a schematic representation of synchronization matched filters.
Figure 5:
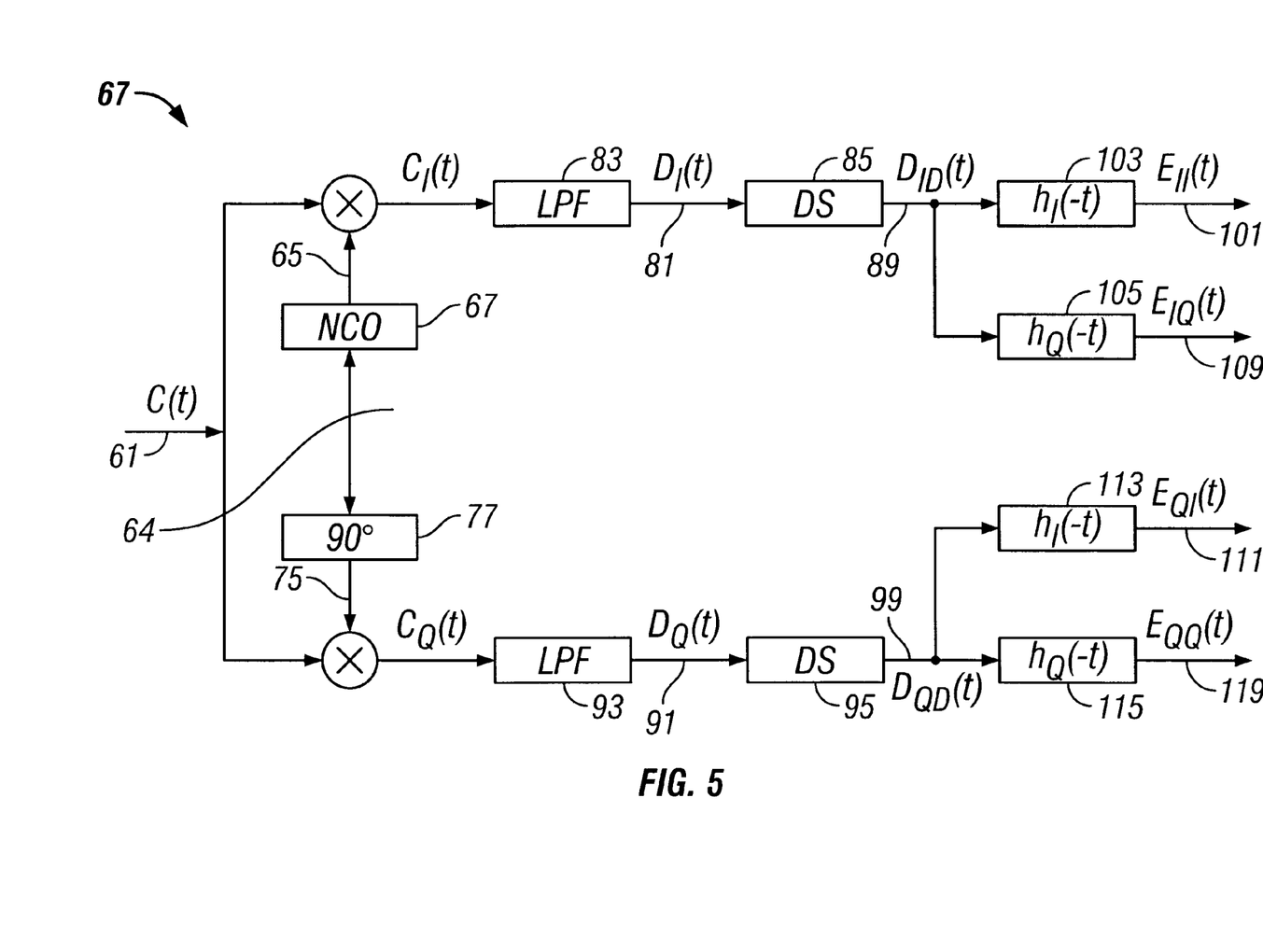
FIG. 5 is a schematic representation of a multiple access QAM demodulator and packet detector.
Figure 6:
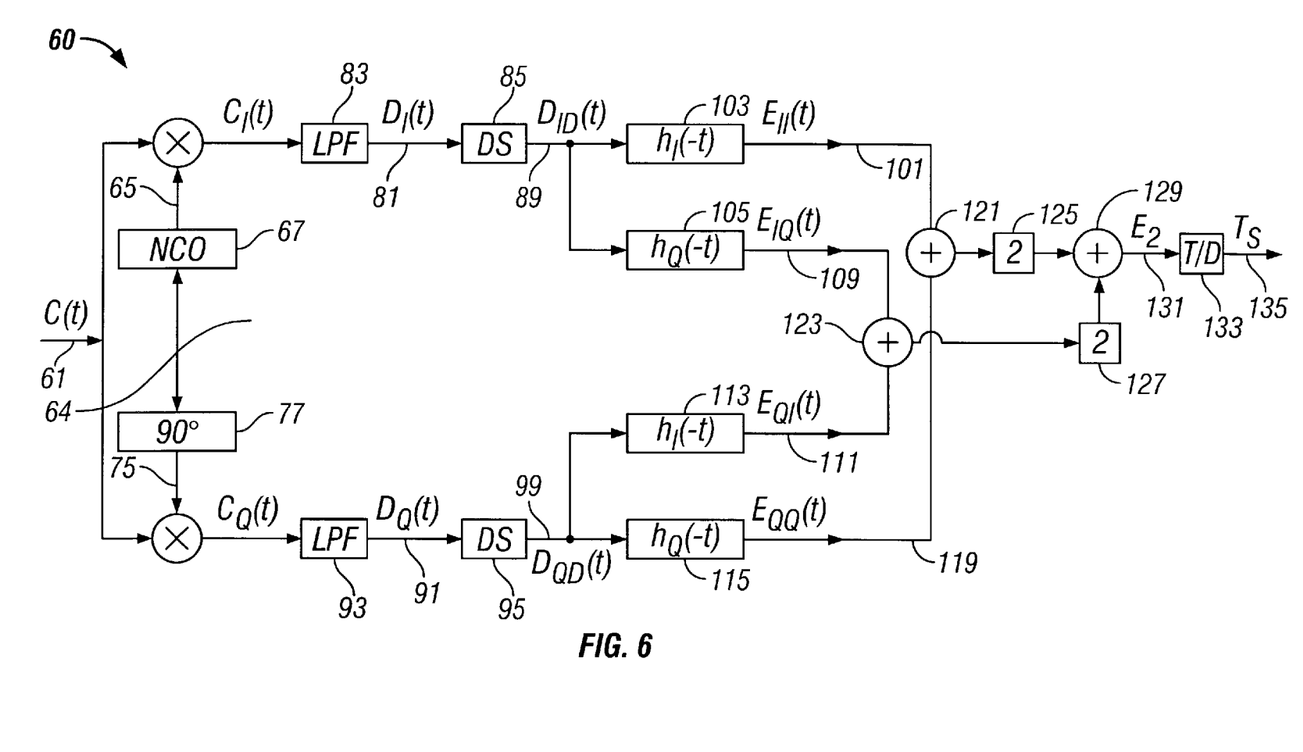
FIG. 6 is a schematic representation of a multiple access QAM demodulator and packet detector.

The synchronization filters of FIG. 4 are added to the multiple access demodulator, as shown in FIG. 3, to provide the system defined by the block diagram of FIG. 5.

The outputs 89, 99 are provided to synchronization filters 103, 105, 113, 115 to produce outputs 101, 109, 111 and 119.

Then, corresponding to equations (13) and (14), the following equations are obtained, $$E_{II}(t)=c_{1I}(t)\cos(\delta_1)+n_{II}(t) \quad (15)$$

$$E_{IQ}(t)=c_{1Q}(t)\sin(\delta_1)+n_{IQ}(t) \quad (16)$$

$$E_{QI}(t)=-c_{1I}(t)\sin(\delta_1)+n_{QI}(t) \quad (17)$$

$$E_{QQ}(t)=c_{1Q}(t)\cos(\delta_1)+n_{QQ}(t) \quad (18)$$

Since the packet synchronization sequence is known, the pairs of these signals may then be added 121, 123 and then squared 125, 127 to obtain an output 131.

$$E^2=[E_{II}(t)+E_{QQ}(t)]^2+[E_{IQ}(t)-E_{QI}(t)]^2=[c_{1I}(t)+c_{1Q}(t)]^2+N \quad (19)$$

and packet detection may be accomplished with a threshold on $E^2$. Note that the pairs of the signals are added before squaring. This results in a 3 db improvement over simply squaring.

Once the start time, $T_S$, of a packet has been determined by the threshold 133 on $E^2$ it is possible to use that information together with equations (15) through (18) in several ways to estimate either $\delta_1$ or $\sin(\delta_1)$ or $\cos(\delta_1)$.

The estimation procedure for $\sin(\delta_1)$ and $\cos(\delta_1)$ is given below.

The peak value of the $c^{}(t)$ occurs at the start time of a packet and is given by, $$c^{}(T_S) = hr \qquad (20)$$

where h is the length of the packet synch sequence and r is the spreading gain. The estimates of $\sin(\delta_1)$ and $\cos(\delta_1)$ are defined as, $$Est[\sin(\delta_1)] = \hat{S} = K\frac{E_{IQ} - E_{QI}}{hr} \qquad (21)$$

and $$Est[\cos(\delta_1)] = \hat{C} = K\frac{E_{II} + E_{QQ}}{hr} \qquad (22)$$

where K is a normalization constant to ensure that the sum off the squares of the two estimates given above is equal to one, so that $$K = \frac{hr}{E} \qquad (23)$$

$$\hat{S} = \frac{E_{IQ} - E_{QI}}{E} \qquad (24)$$

and $$\hat{C} = \frac{E_{II} - E_{QQ}}{E} \qquad (25)$$

Once the start time of a packet has been determined the bit values of the bits in the packet can be obtained by using (24) and (25), as if they were known values, together with equations (13) to (14). Equations (13) and (14) can be rewritten as $$D_{ID}(t) = \hat{C}b_{1I}(t) + \hat{S}b_{1Q}(t) + n_I(t) \qquad (26)$$

$$D_{QD}(t) = -\hat{S}b_{1I}(t) + \hat{C}b_{1Q}(t) + n_Q(t) \qquad (27)$$

Solving these equations for the $b^{**}(t)$ we get $$b_{1I}(t) = \hat{C}D_{ID}(t) - \hat{S}D_{QD}(t) + n_1(t) \qquad (28)$$

$$b_{1Q}(t) = \hat{S}D_{ID}(t) + \hat{C}D_{QD}(t) + n_2(t) \qquad (29)$$

If the $n_I(t)$ and $n_Q(t)$ terms are independent zero mean Gaussian random variables with variances equal to $V^2$ then so are the $n_1(t)$ and $n_2(t)$ terms. Then, using (28), the minimum probability of error decision rule for determining whether $b_{1I}$ is positive or negative is given by $$\hat{b}_{1I} = r \text{ if } \hat{C}D_{ID}(t) - \hat{S}D_{QD} > 0$$

$$\hat{b}_{1I} = -r \text{ if } \hat{C}D_{ID}(t) - \hat{S}D_{QD} < 0 \qquad (30)$$

A similar argument starting from (29) leads to a similar binary hypothesis test for the Q channel $$\hat{b}_{1Q} = r \text{ if } \hat{S}D_{ID}(t) + \hat{C}D_{QD}(t) > 0$$

$$\hat{b}_{1Q} = -r \text{ if } \hat{S}D_{ID}(t) + \hat{C}D_{QD}(t) < 0 \qquad (31)$$

Equations (30) and (31) are not necessarily optimum decisions because the estimated values of the sine and cosine were used as if they were true values, and because it was assumed that the noise in (26) and (27) is Gaussian. But both assumptions look good because the signal to noise ratio out of the packet detection filter is much better than that out of the bit detection filter.

When the expressions for S and C are used in the inequalities (30) and (31) the following equations are obtained, $$\hat{b}_{1I} = r \text{ if } D_{ID}(E_{II} + E_{QQ}) - D_{QD}(E_{IQ} - E_{QI}) > 0$$

$$\hat{b}_{1I} = -r \text{ if } D_{ID}(E_{II} + E_{QQ}) - D_{QD}(E_{IQ} - E_{QI}) < 0 \qquad (32)$$

and $$\hat{b}_{1Q} = r \text{ if } D_{ID}(E_{IQ} - E_{QI}) + D_{QD}(E_{II} + E_{QQ}) > 0$$

$$\hat{b}_{1Q} = -r \text{ if } D_{ID}(E_{IQ} - E_{QI}) + D_{QD}(E_{II} + E_{QQ}) < 0 \qquad (33)$$

While the invention has been described with reference to specific embodiments, modifications and variations of the invention may be constructed without departing from the scope of the invention, which is defined in the following claims.

We claim:

1. A receiver packet detector apparatus for single spreading sequence spread bit packet signal transmissions having in-phase and quadrature components, comprising a received signal input line, a QAM modulator connected to the input line, the QAM modulator further comprising a splitter connected to the input line for separating received signals into first and second paired inputs, first and second multipliers connected to the first and second paired inputs, a numerically controlled oscillator connected to the first multiplier, a 90° phase shifter connected to the numerically controlled oscillator and connected to the second multiplier, first and second output lines connected to the first and second multipliers, first and second low pass filters connected to the first and second output lines for removing high frequencies from the output lines, first and second low frequency signal lines connected to outputs of the first and second low pass filters, first and second identical despreading filters connected to the first and second low frequency signal lines, first and second despread signal lines connected to outputs of the first and second despreading filters, and first and second pairs of synchronization matched filters connected to the first and second despread signal lines for producing packet synchronization sequence outputs.

2. The apparatus of claim 1, wherein the first and second pairs of synchronization matched filters comprise a first pair of first and second synchronization matched filters connected in parallel to the first despread signal line and an identical second pair of third and fourth synchronization matched filters connected in parallel to the second despread signal line.

3. The apparatus of claim 2, further comprising a first adder connected to outputs of the first and fourth synchronization matched filters, a second adder connected to outputs of the second and third synchronization matched filters, first and second squarers connected to the first and second adders, a third adder connected to outputs of the first and second squarers, and a threshold detector connected to an output of the third adder for detecting a signal level change and, hence, a start time of a packet.

4. A receiver packet detector apparatus for single spreading sequence spread bit packet signal transmissions, comprising a received signal input line, a QAM modulator connected to the input line, the QAM modulator comprising a splitter connected to the input line for separating the input into first and second paired inputs, first and second multipliers connected to the first and second paired inputs, a numerically controlled oscillator connected to the first multiplier, a 90° phase shifter connected to the numerically controlled oscillator and connected to the second multiplier, first and second output lines connected to the first and second multipliers, first and second low pass filters connected to the first and second output lines for removing high frequencies from the outputs, first and second demodulated signal lines connected to outputs of the first and second low pass filters, and identical first and second despreading filters connected to the first and second demodulated signal lines, first and second despread signal lines connected to outputs of the first and second despreading filters, and first and second identical pairs of synchronization matched filters connected to the first and second despread signal lines for producing packet synchronization sequence outputs.

5. The apparatus of claim 4, wherein the pairs of synchronization matched filters comprise first and second synchronization matched filters connected in parallel to the first despread signal line and third and fourth synchronization matched filters connected in parallel to the second despread signal line.

6. The apparatus of claim 5, further comprising a first adder connected to outputs of the first and fourth synchronization matched filters, a second adder connected to outputs of the second and third synchronization matched filters, first and second squarers connected to the first and second adders, a third adder connected to outputs of the first and second squarers, and a threshold detector connected to an output of the third adder for detecting change in a signal level from the third adder and, hence, a start time of a packet.

7. A receiver packet detector apparatus for single spreading sequence spread bit packet signal transmissions having in-phase and quadrature components, comprising a received signal input line, a modulator connected to the input line, the modulator further comprising a multiplier connected to the input line, an oscillator connected to the multiplier, an output line connected to the multiplier, a low pass filter connected to the output line for removing high frequencies from the output line, a low frequency signal line connected to an output of the low pass filter, a despreading filter connected to the low frequency signal line, a despread signal line connected to an output of the despreading filter, a pair of synchronization matched filters connected to the despread signal line for producing packet synchronization sequence outputs, an adder connected to outputs of the synchronization matched filters, a squarer connected to the adder, and a threshold detector connected to an output for detecting a signal level change and, hence, a start time of a packet.

8. A receiver packet detecting method for detecting single spreading sequence spread bit packet signal transmissions having in-phase and quadrature components, comprising receiving input signals having in-phase and quadrature components in an input line, connecting a QAM modulator to the input line, connecting a splitter to the input line, separating the input signals into first and second paired inputs, connecting first and second multipliers to the first and second paired inputs, connecting a numerically controlled oscillator to the first multiplier, connecting a 90° phase shifter to the numerically controlled oscillator and to the second multiplier, connecting first and second output lines to the first and second multipliers, connecting first and second low pass filters to the first and second output lines for removing high frequencies from the outputs, connecting first and second low frequency signal lines to outputs of the first and second low pass filters, connecting first and second identical despreading filters to the first and second low frequency signal lines, connecting first and second despread signal lines to outputs of the first and second despreading filters, and connecting first and second identical pairs of synchronization matched filters to the first and second despread signal lines for producing packet synchronization sequence outputs.

9. The method of claim 8, wherein the connecting of first and second identical pairs of synchronization matched filters comprises connecting a first pair of first and second synchronization matched filters in parallel to the first despread signal line and connecting a second identical pair of third and fourth synchronization matched filters in parallel to the second despread signal line.

10. The method of claim 9, further comprising connecting a first adder to outputs of the first and fourth synchronization matched filters, connecting a second adder to outputs of the second and third synchronization matched filters, connecting first and second squarers to outputs of the first and second adders, connecting a third adder to outputs of the first and second squarers, and connecting a threshold detector to an output of the third adder for detecting an increase in output of the third adder and, hence, a start time of a packet.

11. A method of information detection in a single spreading sequence receiver, comprising receiving single spread sequence chips and packets in QAM modulated carrier wave signals with in-phase and quadrature components, supplying the received signals to first and second multipliers, supplying output from a numerically controlled oscillator to the first multiplier and to a 90° phase shifter, supplying an output from the 90° phase shifter to the second multiplier, supplying output signals from the first and second multipliers to first and second low pass filters and removing high frequency signals in the low pass filters, providing first and second outputs from the first and second low pass filters to identical first and second despreading filters, and providing first and second despread signals from outputs of the identical first and second despreading filters to inputs of first and second pairs of identical synchronization filters.

12. The method of claim 11, further comprising connecting in parallel inputs of first and second synchronization filters of the first pair and supplying the first despread signals from the first despreading filter to the inputs of the first and second synchronization filters, connecting in parallel inputs of third and fourth synchronization filters in the second pair and supplying the second despread signals from the output of the second despreading filter to the inputs of the third and fourth synchronization filters, supplying outputs of the first and fourth synchronization filters to a first adder, supplying outputs of the second and third sychronization filters to a second adder, squaring an output of the first adder and squaring an output of the second adder in first and second squarers, adding squared outputs from the first and second squarers in a third adder, and detecting a threshold of an output from the third adder.

13. A method of information detection in a single spreading sequence receiver, comprising receiving chips in packets in modulated carrier wave signals with in-phase and quadrature components, supplying the received signals to first and second multipliers, supplying output from an oscillator to the first multiplier and to a phase shifter, supplying an output from the phase shifter to the second multiplier, supplying output signals from the first and second multipliers to first and second low pass filters and removing high frequency signals in the low pass filters, providing first and second outputs from the first and second low pass filters to identical first and second despreaders, and providing first and second despread signals from outputs of the first and second despreaders to inputs of first and second identical pairs of synchronization filters.

14. The method of claim 13, further comprising supplying the first despread signals from the first despreader to inputs of first and second synchronization filters, supplying the second despread signals from the second despreader to inputs of the third and fourth synchronization filters, supplying outputs of the first and fourth synchronization filters to a first adder, supplying outputs of the second and fourth sychronization filters to a second adder, squaring an output of the first adder and squaring an output of the second adder, adding the squared outputs third adder, and detecting a threshold of the squared and added outputs as an indicator of a packet start time.

* * * * *